United States Patent [19]

Eugster

[11] Patent Number: 5,186,998
[45] Date of Patent: Feb. 16, 1993

[54] DUPLEX FILTER CLOTH AND METHOD

[75] Inventor: John R. Eugster, Salt Lake City, Utah

[73] Assignee: National Filter Media Corporation, Salt Lake City, Utah

[21] Appl. No.: 528,821

[22] Filed: May 21, 1990

[51] Int. Cl.$^5$ .............................................. B32B 3/06
[52] U.S. Cl. .................................... 428/102; 112/440; 112/441; 112/262.1; 112/262.2; 112/262.3; 210/505; 428/192; 428/193
[58] Field of Search ................. 428/102, 192, 193, 57, 428/58; 210/505; 112/418, 425, 428, 440, 441, 262.1, 262.2, 262.3

[56] References Cited

U.S. PATENT DOCUMENTS 4,545,833 10/1985 Tafara ................................ 112/441

Primary Examiner—James J. Bell
Attorney, Agent, or Firm—Mallinckrodt & Mallinckrodt

[57] ABSTRACT

A duplex filter cloth for chamber type filters has two initially separate pieces secured together, as by stitching, around circumferential terminal edges of turned-down collar portions of the respective pieces, which portions are closely and smoothly interlapped to provide a barrel neck for the duplex filter cloth. Turning down of the collar portions is accomplished by an elongate conical mandrel of a jig press which operates relative to mandrel-receiving openings in pairs of bed plates, inserted in turn in such jig press, to effectively turn-down circumferential marginal portions of filtrate feed openings of respective flat filter cloth sheets.

7 Claims, 2 Drawing Sheets

DUPLEX FILTER CLOTH AND METHOD

BACKGROUND OF THE INVENTION

1. Field

The invention is in the field of fabricated filter cloths for installation on chamber type filter presses prior to passing a solids-containing liquid therethrough to remove the solids from the liquid. Such filter cloths are commonly called "duplex" filter cloths.

2. State of the Art

Duplex filter cloths in the form of double pieces of sheet filter cloth material with interconnecting collar about the circumferential margins of the filtrate-feed openings of the two otherwise separate pieces are well known and widely used in chamber type filter presses.

The individual filter cloth pieces are conventionally fabricated from felted filter cloth material by cutting flat sheets, usually of equal size, from the sheet filter cloth material, inturning inner margins bordering the respective filtrate-feed openings thereof, and sewing such inturned margins to corresponding circular margins of a separate collar, usually made of a strong material such as a length of a coarsely woven fabric tape. Fabricated in this way, however, the so-called "barrel neck" collar joining the two filter cloth pieces together around their filtrate-feed openings do not fit snugly and smoothly against the supporting structure of the filter press in which they are installed.

SUMMARY OF THE INVENTION

In accordance with the present invention, a duplex filter cloth product of the type concerned and of given dimensions to fit a given size of filter press is fabricated by cutting, from a sheet of conventional filter cloth material, two individual pieces of similar shape but of slightly unequal size in that, while their outer peripheries are normally the same, the diameters of their filtrate feed openings are not. One is enough less in diameter than the other to allow its inturned margin to overlap the inturned margin of the other, such margins being of respective widths that provide for preferably substantially complete interlap in any of the various sizes in which such filter cloths are made.

When these margins are inturned and interlapped in the assembly of the two pieces, circular seams are preferably sewn around opposite edge portions, respectively, of the composite collar so formed. It has been found that the resulting double thickness collar, of the same material of which the duplex filter cloth product is made and firmly secured together by the seaming or other securing means, overcomes the difficulties in fit and operative effectiveness of duplex filter cloths as conventionally made and used.

The duplex filter cloth product of the invention is fabricated by a unique method of forming the collar portion of each of the two pieces, preferably utilizing apparatus which, in itself, is unique. Thus, each piece is cut to the required outer and inner dimensions and then placed in a jig press equipped with interchangeable stationary bed plates. The bed plates have central circular openings differing, respectively, in diameter, there being pairs of such plates in which the central openings are closely but slightly differently dimensioned for the same size of the duplex filter cloth product. The jig press includes a conical plunger serving as a mandrel and having different diameters intermediate its length adapted to cooperate, respectively, with the slightly differently dimensioned center openings of the respective bed plates of a pair to properly turn down the defining margins of the center openings of the two separate flat sheet filter cloth pieces used in the assembling of a particular duplex filter cloth product.

Sewing of the interlapped collar portions of the two filter cloth pieces about respective terminal edge portions of such collar portions is ordinarily accomplished by manual operation of a suitable industrial type of sewing machine, but other securement means may be utilized.

THE DRAWINGS

The best mode presently contemplated for carrying out the invention in practice is illustrated in the accompanying drawings, in which:

FIG. 1 represents a fragmentary, perspective view of a completely fabricated, duplex filter cloth product of the invention, looking into the space between joined, but otherwise separate, filter cloth pieces to show the smooth interior face of the barrel neck collar;

FIG. 2, a diametric vertical section taken along the line 2—2 of FIG. 1;

FIG. 3, a view in vertical axial section of a jig press preferably utilized in the forming of the separate filter cloth pieces used in the fabrication of the duplex filter cloth product of FIGS. 1 and 2, the mandrel plunger being in raised position and a flat, annular sheet of filter cloth material being shown on a selected bed plate of the apparatus prior to turn-down of the collar portion;

FIG. 4, a similar but fragmentary view showing the mandrel in a downward, collar-portion-turn-down position; and FIG. 5, a schematic showing of the pneumatic workpiece-hold-down and plunger-operating system of the jig press of FIGS. 3 and 4.

DETAILED DESCRIPTION OF THE ILLUSTRATED EMBODIMENT

Figure 1:
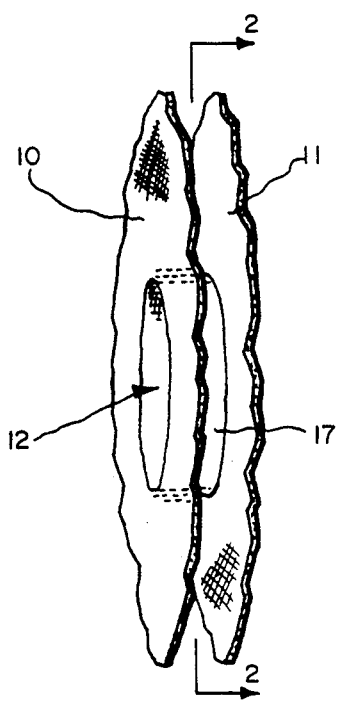
Figure 2:
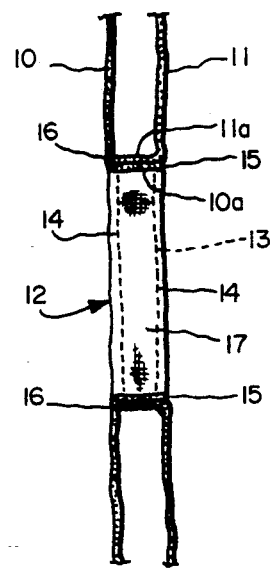

In its illustrated form, the duplex filter cloth product of the invention as shown in FIGS. 1 and 2 comprises two filter cloth pieces 10 and 11, each cut from usual sheet filter cloth material and provided with turned-down collar portions 10a and 11a, respectively, defining the respective inner, central, filtrate feed openings of the two pieces 10 and 11, which, together, provide a filtrate feed hole 12 for the duplex product. The turned-down collar portions 10a and 11a are formed from circumferential portions of the respective filter cloth pieces marginal to the filtrate-feed openings thereof, in a manner explained hereinafter.

The turned-down collar portions 10a and 11a are interlapped as shown and secured together in any suitable manner, as by sewing circular lines of stitching 13 and 14, FIG. 2, around the terminal edges 15 and 16 of the respective collar portions. As closely and smoothly interlapped and attached together, these collar portions form an improved version of what is known in the art as a "barrel neck" 17.

Figure 3:
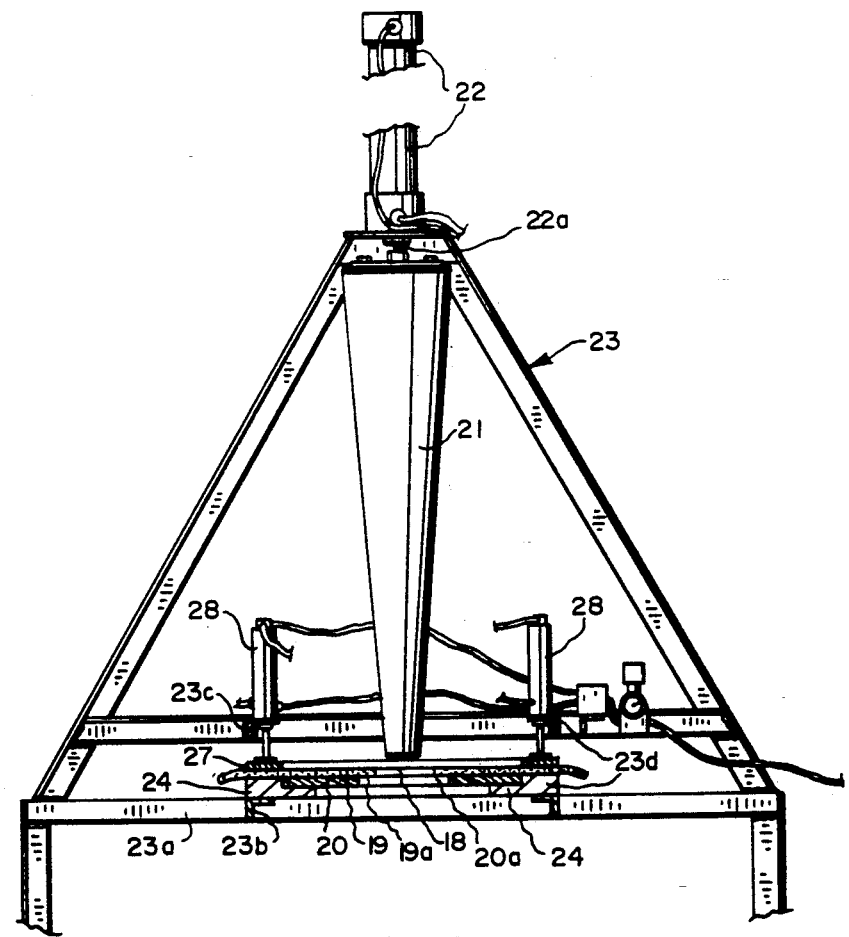

Interlapping of the turned-down collar portions 10a and 11a of filter cloth pieces 10 and 11, respectively, is made possible by the fact that the filtrate feed opening of one of the flat sheets of filter cloth material, see the opening 18 of the sheet 19, FIG. 3, is of slightly less diameter than is the other and that the turned-down collar portion, See 19 as of that sheet and of the resultant annular filter cloth piece, here the piece 10 and the collar portion 10a thereof overlaps and is fitted closely and smoothly against the turned-down collar portion of the other, here the piece 11 and the collar portion 11a, see FIGS. 1 and 2.

The extent of turn-down of the circumferential margins of the feed holes of the respective flat sheets of filter cloth material is preferably such that the resulting collar portions interlap substantially fully when the two filter cloth pieces are placed together.

Each of the two filter cloth pieces 10 and 11 are advantageously made by placing a properly dimensioned, flat sheet of filter cloth material, such as the sheet 19, on bed plate, such as shown at 20, with the center of its filtrate feed opening 18 coincident with the center of the corresponding but larger opening 20a of the bed plate. The particular bed plate will be selected from pairs of bed plates corresponding to given sizes of duplex filter cloth products for given sizes of filter presses, and one bed plate of each pair will have the diameter of its opening less than the diameter of the opening of the other member of the pair by an amount that will provide for overlapping of the turned down collar portion of the filter cloth piece, made on the other bed plate of the pair, by the turned-down collar portion of the filter cloth piece made on the one bed plate of the pair. This amount will depend on the thickness of the sheet of filter cloth material from which the individual flat sheets are cut.

Figure 4:
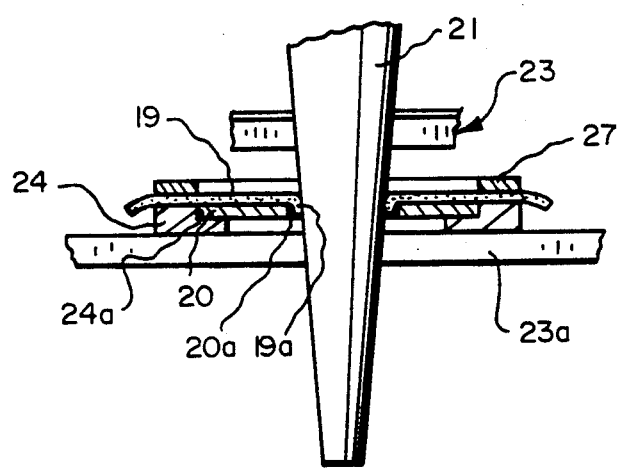

The special jig press comprises a conical plunger 21, FIGS. 3 and 4, working (small end first) within a receiving opening, here 20a, of a selected bed plate, here 20, and serving as a mandrel. The large end of the mandrel plunger is attached to the lower end of an extendable and retractable part 22a of an elongate, vertically placed, pneumatic cylinder 22 for down and up movement relative to a framework 23 having horizontal frame members 23a and 23b that support a bed-plate-receiving bed 24 of the jig press.

The bed plate, 20, fits into a receiving recess 24a of jig press bed 24, where it remains immovable during operation of the press.

A flat filter cloth sheet, here the sheet 19, FIG. 3, is placed on its corresponding bed plate, 20, of the selected pair, that has been fitted into the receiving recess 24a of the bed 24 of the filter press, being properly aligned therewith and being below a clamping plate 27 that is placed upon such sheet, 19, and below a series of pneumatic power cylinders 28, respectively, which plate and power cylinders serve to clamp such sheet firmly in place during operation of the press. Power cylinders 28 are mounted on frame members 23c and 23d of framework 23.

As previously indicated, the conical formation of plunger mandrel 21 has a cross-sectional circumference and diameter at some point along its length that is adapted to cooperate with the diametric edge of the opening, 20a, of the selected bed plate, 20, so as to properly turn down the circumferential margin of the filtrate-feed opening, 18, 19a, defining the flat filter cloth sheet for interlapping with the turned-down circumferential margin of its companion filter cloth sheet in the final fabrication of the duplex filter cloth product of the invention.

Figure 5:
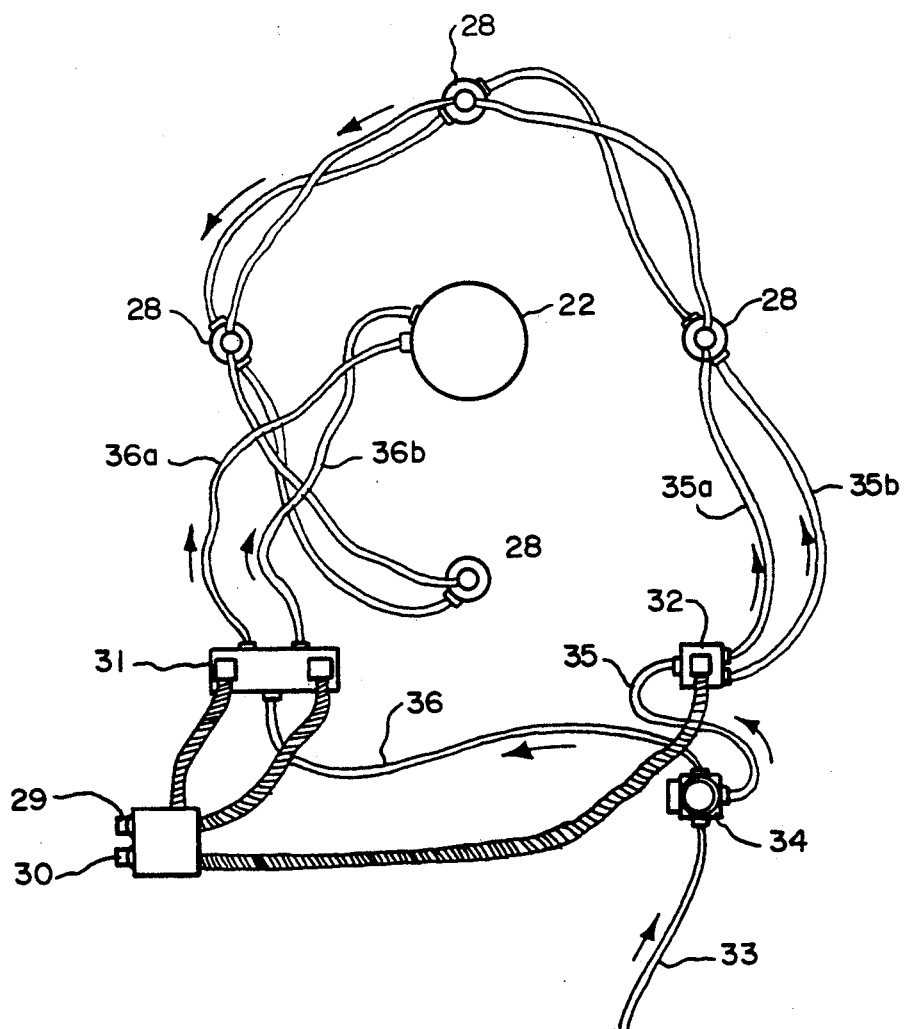

Control of press operation may be effected in numerous ways, but, as illustrated in FIG. 5, control is manually accomplished through electrical on and off witches 29 and 30 controlling respective solenoid operated, pneumatic valves 31 and 32, which control flow of air through a main line 33 from a suitable source of air pressure, such as the storage tank of an air compressor (not shown), through a pressure regulating valve 34 and branch line 35 and sub-branch lines 35a and 35b to top and bottom, respectively, of sheet hold-down, pneumatic power cylinders 28 and through branch line 36 and sub branch lines 36a and 36b to the top and bottom of the elongate pneumatic power cylinder 22.

Valves 31 and 32 may be those produced by Aro Corporation of Bryan, Ohio, and designated K313FD-120A-109 and 6212FF-120A-1278, respectively.

The conical mandrel plunger 21 of the filter press and the bed plates, here represented by bed plate 20, are advantageously of wood so as to yield somewhat as the mandrel plunger is pressed into the receiving opening of the bed plate and wedged against the turned-down circumferential margin of the flat filter cloth sheet, here represented by the sheet 19.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A duplex filter cloth product for use on chamber type filter presses, comprising two initially separate pieces of a filter cloth material each having a filtrate feed opening intermediate its periphery, the opening of one being of less diameter than that of the other and each having the circumferential margin of such opening turned down and interlapped as component collar parts of a barrel neck for such product, the piece with feed hole opening of lesser diameter having its turned-down margin closely and smoothly fitted over and against the turned-down margin of the other and defining the filtrate feed hole of the final product; and means attaching said turned-down interlapped margins to each other to retain the close and smooth fit.

2. A duplex filter cloth product according to claim 1, wherein the means attaching the turned-down margins to each other comprise circular lines of stitching around the terminal edges of the respective turned-down margins at opposite circumferential portions of the barrel neck.

3. A duplex filter cloth product according to claim 1, wherein the turned-down circumferential margin of the one filter cloth piece overlaps substantially fully the margin of the other when the two pieces are placed together in interlapping relationship.

4. A method of fabricating a duplex filter cloth product for use on chamber type filter presses, comprising cutting out from sheet filter cloth material two separate flat sheets having respective filtrate feed openings intermediate the periphery thereof, the opening of one being of less diameter than that of the other; turning down the circumferential margin of the feed opening of said sheets of filter cloth material to provide two filter cloth pieces having respective turned-down margins that will interlap when the two pieces are placed together with the interlapped margins serving as component parts of a barrel neck for the duplex filter cloth product; placing the so-formed pieces together so that the turned-down margin of the one with filtrate feed opening of less diameter is closely and smoothly fitted over and against the turned-down margin of the other to define the filtrate feed hole and the barrel neck of the final product; and attaching said turned-down margins to each other so as to achieve the close and smooth fit.

5. A method according to claim 4, wherein the turned down margins are attached to each other by sewing around the terminal edges of the respective turned-down margins at opposite circumferential portions of the barrel neck.

6. A method according to claim 4, wherein the turned-down circumferential margin of the filtrate feed opening of the one filter cloth piece overlaps substantially fully the margin of the other when the two pieces are placed together in interlapping relationship.

7. A method according to claim 4, wherein margins bordering the filtrate feed openings of the respective flat filter cloth sheets are turned down by placing said sheets on corresponding bed plates, respectively, in a jig press having an open bed for supporting the bed plates in turn, said plates having respective, appropriately sized, mandrel-receiving openings, said sheets being placed with the centers of their openings coincident with the centers of the openings of the respective bed plates; by forcing, in turn, an appropriately sized, conical, mandrel plunger into the respective filtrate feed openings of said flat filter cloth sheets, small end first; and by advancing, in turn, said mandrel plunger into said filtrate feed openings until the circumferential marginal portions bordering said filtrate feed openings of the respective sheets are turned down against the bed plate by pressure of said mandrel plunger.

* * * * *

UNITED STATES PATENT AND TRADEMARK OFFICE
CERTIFICATE OF CORRECTION

PATENT NO. : 5,186,998
DATED : February 16, 1993
INVENTOR(S) : John R. Eugster

It is certified that error appears in the above-identified patent and that said Letters Patent is hereby corrected as shown below:

```
Column 2, line 67, "See 19 as" should be ", see 19a,".

Column 3,
    line 66, "witches" should be "switches".
```

Signed and Sealed this

Twenty-first Day of December, 1993

Attest:

BRUCE LEHMAN

Attesting Officer

Commissioner of Patents and Trademarks